Figure 1:
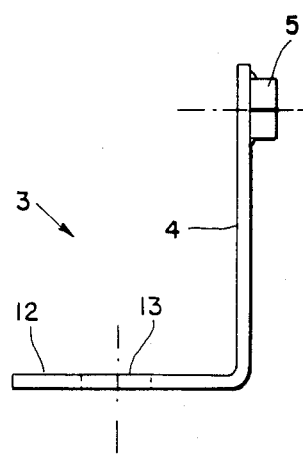

United States Patent [19]

Wanner

[11] Patent Number: 4,982,923
[45] Date of Patent: Jan. 8, 1991

[54] DEVICE FOR ADJUSTABLE MOUNTING OF GUIDE RAILS ON A BASE

[75] Inventor: Hans Wanner, Herisau, Switzerland

[73] Assignee: Fritz Haug, AG, St. Gallen, Switzerland

[21] Appl. No.: 395,081

[22] Filed: Aug. 17, 1989

[30] Foreign Application Priority Data

Aug. 18, 1988 [CH] Switzerland ............... 3083/88

[51] Int. Cl.$^5$ .................................................. E04G 3/00
[52] U.S. Cl. .................................. 248/286; 248/157; 248/161; 248/371; 248/284
[58] Field of Search ............ 248/286, 284, 291, 295.1, 248/296, 371, 397, 664, 676, 161, 157, 183, 316.1; 269/71, 45; 403/408.1, 405.1; 256/65

[56] References Cited

U.S. PATENT DOCUMENTS

| 2,936,803 | 5/1960 | Jorick, Jr. ................ 269/45 |
| 3,674,246 | 7/1972 | Freeman ................ 403/408.1 X |
| 4,035,093 | 7/1977 | Redshaw ................ 403/408.1 X |
| 4,174,086 | 11/1979 | Verberkmoes ................ 248/291 X |
| 4,368,866 | 1/1983 | Urban ................ 248/286 |
| 4,807,947 | 2/1989 | Nuzzo ................ 248/295.1 X |

Primary Examiner—Ramon O. Ramirez
Attorney, Agent, or Firm—Shoemaker and Mattare

[57] ABSTRACT

The device has a pedestal (3) that is fastened tightly to base (2). The pedestal has two receiving openings for screws as well as an arc-shaped slot (6) in a plate (4). An adjustable element (7) can be fastened to pedestal (3). This adjustable element (7) has two parallel slots (9,9') as well as a receiving opening for a screw. Depending on the placement of screws (11,11'), adjustable element (7) can be moved plane parallel to base (2) in slots (9,9') or swiveled within arc-shaped slot (6) at an angle to base (2).

6 Claims, 3 Drawing Sheets

DEVICE FOR ADJUSTABLE MOUNTING OF GUIDE RAILS ON A BASE

The invention is a device for the adjustable mounting of guide rails on a base, in particular the guide rails for processing equipment.

For concrete sawing, for example, a guide rail with integrated toothed rack has to be fastened to the concrete slab which is to be sawed. The hydraulic concrete saw is automatically advanced on this guide rail, while the saw blade cuts the concrete to the desired depth. The guide rail here consists of elements that can be assembled to form any desired rail length. Broad rails are particularly advantageous because they make it possible to support the cutting forces without much twisting and floating.

Known guide rail devices, however, have problems, particularly when it comes to fastening them to the base. As a rule, these bases are not absolute flat. Thus, when screwing the guide rails directly to the base, deformations of the guide rails can result. An exact adjustment of these uneven spots through wedges or similar devices results in a disproportionately high expenditure of labor.

The invention therefore is an effort to create a device as above, but which permits fastening of the guide rails securely even to an irregular base and without great work expenditure. In addition, the device is designed to fasten the guide rails easily at any angle to the base.

This is done in the invention through the characteristics as described in claim 1.

As can be seen, the special formation of pedestal and adjustable element makes it possible for the adjustable element to be adjusted up high, plane parallel to the base or to be swiveled from this parallel position at an angle to the base, depending on the arrangement of the fasteners. At the desired relative position of the adjustable element, the fasteners are tightened so that the adjustable element is pressed tensionally against the pedestal. A particularly rational working method is achieved if nuts fastened to the plates form the receiving openings. In that case, the device can be fastened with the aid of two screws, pushed through the respective slots. No other parts or auxiliary means are necessary. Of course it is also possible to cut tap holes directly into the plates in place of the screw nuts. It is also possible to form the openings as simple boreholes, whereby loose screw nuts would be needed to fasten the device.

It is advantageous to have an angular pedestal. The pedestal plate should have an opening. The pedestal reduces the specific pressure per unit of area so that no pressing in or sinking in has to be feared with a poor base. The opening is designed to screw the pedestal to the base below and can be big, square, round or slotted, so that it is possible to move sideways in order to compensate for drilling or measuring mistakes.

Another possibility for adjustment is created by making the pedestal a fixable hinge so that the angle between plate and base can be adjusted. Such a lockable hinge would make it possible to fasten the guide rails even to a difficult base such as steps.

A secure fastening of the guide rails is achieved if the adjustable element is angular and has a bracket plate with at least one guiding element that gears into the guide rails itself.

Figure 2:
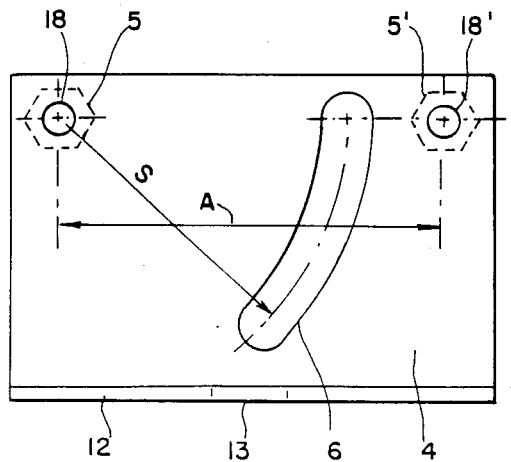
Figure 3:
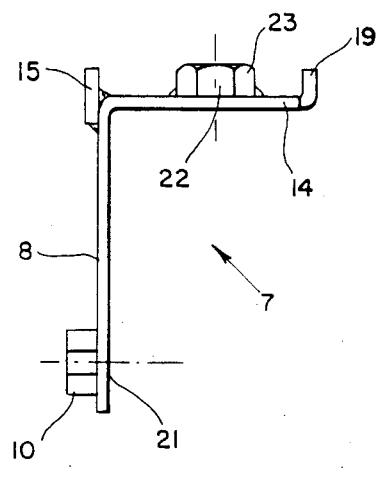
Figure 4:
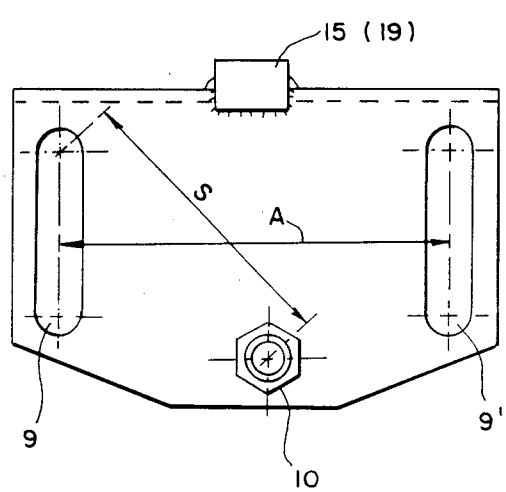
Figure 5:
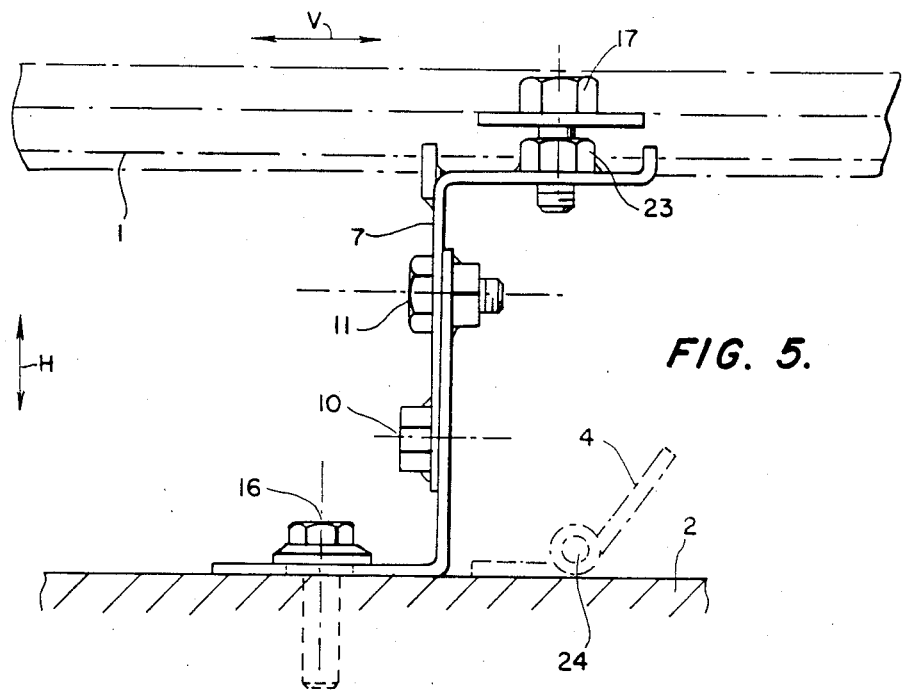
Figure 6:
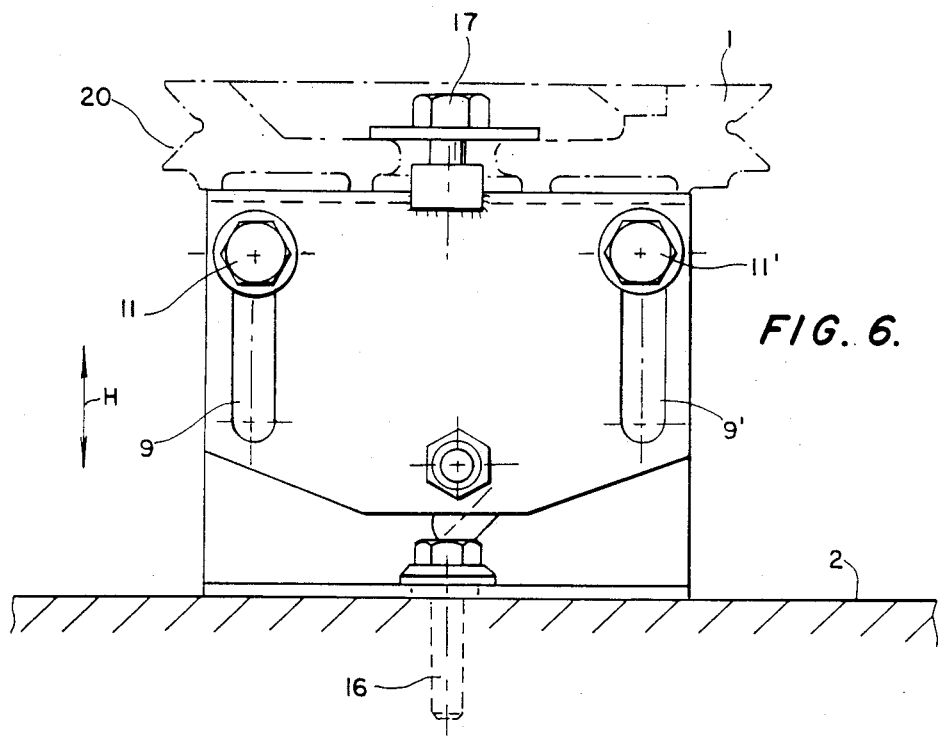
Figure 7:
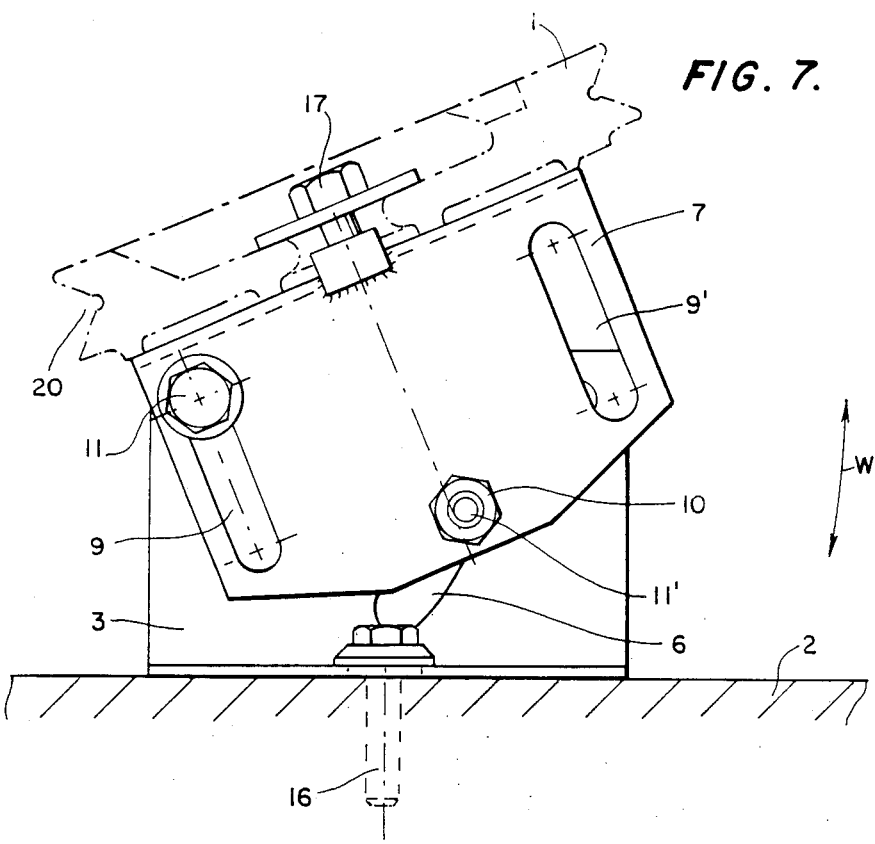
Figure 8:
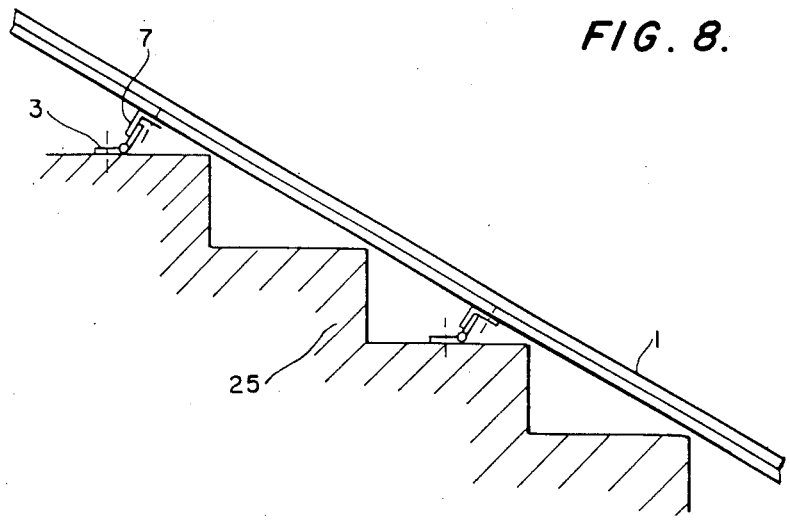

Other advantages and individual features of this invention can be seen in the following description of a design example and drawings. Shown are:

FIG. 1 A side view of the pedestal.
FIG. 2 A view of the pedestal according to FIG. 1.
FIG. 3 A side view of the adjustable element.
FIG. 4 A view of the adjustable element according to FIG. 3.
FIG. 5 A side view of the assembled device.
FIG. 6 A view of the device according to FIG. 5 with guide rail plane parallel to the base.
FIG. 7 A view of the device according to FIG. 5 with the guide rail at an angle to the base.
FIG. 8 An example of a guide rail mounted to a step.

FIGS. 1 and 2 show a pedestal 3 which is almost angular and consists of a base plate 12 and a plate 4. mounted approximately at a right angle to it. Base plate 12 has, for example, a round or slot-shaped opening 13. At the upper corners of plate 4, boreholes 18 are situated, and behind those are screw nuts 5, which are welded directly to plate 4. The screw nuts 5 are designed as openings for screws as will be described in detail in the following. The nuts 5, 5' are arranged at a distance A to each other. On the connecting axis between the boreholes 18, 18' an arc-shaped slot 6 is located which extends around the center of borehole 18 with a turning radius S at a 45° angle downward.

Adjustable element 7 shown in FIGS. 3 and 4 is also nearly angular and consists of plate 8 and a bracket plate 14 mounted at a right angle to it. Bracket plate 14 has a distortion 19 at its outer edge which can serve as side guide in a rail groove. In addition, a guide 15 is welded to plate 8. Plate 8 has parallel slots 9, 9'. The distance A between them is the same as distance A between boreholes 18, 18' on pedestal 3. Between the slots 9, 9' a nut 10 has been welded to the lower area of plate 8. This nut also is situated above a borehole 21, the center of which is approximately at a distance S to the upper center of slot 9. Distance S here corresponds to radius S of slot 6 on pedestal 3. A nut 23 is also welded to bracket plate 14 below a borehole 22.

FIGS. 5 to 7 show how the pedestal and the adjustable element interact. FIGS. 5 and 6 show a plane parallel arrangement of guide rail 1 to base 2. The pedestal 3 is screwed tightly to base 2 with the aid of a bottom bolt 16. Screws 11, 11' project through the parallel slots 9, 9' of adjustable element 7 and catch in nuts 5, 5' of pedestal 3.

Guide rail 1 is fixed with the aid of a screw. 17 which catches in nut 23. As can be seen from FIG. 6, guide rail 1 may have guide grooves 20 on the side which may serve, for example, to move the guide shoes or roller bearings of the slide forward. Of course, the guide rail can have any other desired configuration. The V in FIG. 5 stands for the advance direction of the machine tool on guide rail 1. The guide rail, however, can also be mounted at a different angle relative to plates 4 and/or 8.

To adjust the height and in arrow direction H of guide rail 1, plane parallel to base 2, the two screws 11 and 11' are loosened so that adjustable element 7 can be lifted and/or lowered in slots 9, 9'. In FIG. 6, the adjustable element 7 is shown in its lowest position. Of course, it is also conceivable to arrange slots 9, 9' not at a right angle, but at an incline to bracket plate 14.

If guide rail 1 is to be swiveled relative to base 2, screw 11' is to be removed from nut 5' and/or slot 9' and screwed into nut 10 of the adjustable element through the arc-shaped slot 6 on the back of pedestal 3. This arrangement is shown in FIG. 7, whereby only the screw bolt of screw 11' is seen protruding from nut 10. Thus, the adjustable element 7 can be swiveled at a maximum 45° angle around the center of screw 11 and in arrow direction W. Thus, it is very simple to make a slanting cut in base 2 with a concrete saw moved along guide rail 1. Of course, the arc-shaped slot can be more or less than 45°. For a slanting position to the other side, the arrangement only has to be shifted by 180° It is obvious that to do this only screw 17 has to be loosened.

FIG. 5 demonstrates the possibility of connecting plate 4 of pedestal 3 with base plate 12 through a hinge 24. This hinge could be fastened such that guide rail 1 could swivel around another axis relative to base 2. Thus, it would be possible to fasten pedestal 3 on steps, as can be seen in FIG. 8. In that case, the adjustable element 7 would have to be angled such that guide rail 1 runs parallel to the slope of the stairs.

I claim:

1. Device for the adjustable mounting of guide rails (1) on a base (2), characterized by a pedestal (3) that is fastened securely to the base (2) and has a first plate (4) with at least two receiving openings (nuts 5) at a distance (A) from each other, used to mount fastening elements (11), and which also has an arc-shaped slot (6) as well as an adjustable element (7) securely connected to a guide rail segment, with a second plate (8) containing two parallel slots (9, 9') at the same distance (A) as the receiving openings on the pedestal, as well as at least one receiving opening (nut 10) between the two, used to fasten a coupling member (11), whereby the adjustable element (7) can be secured in position on the pedestal (3) through coupling members (11) and whereby these engage in the receiving openings (screws 5 and/or 10) through parallel slots (9, 9') or a parallel slot (9) and the arc-shaped slot (6) through both parallel slots or through one parallel slot and the arc-shaped slot.

2. Device according to claim 1, characterized by the fact that the receiving openings are formed by screw nuts 5 and/or 10) fastened to the plates (4 and/or 8).

3. Device according to claims 1 or 2, characterized by the fact that pedestal (3) is angular and has a foot plate (12) with opening (13).

4. Device according to claims 1 or 2, characterized by the fact that the pedestal is designed as a lockable hinge so that the angle between first plate (4) and base (2) is adjustable.

5. Device according to claims 1 or 2 characterized by the fact that the adjustable element (7) one guide element (15) that engages in guide rail (1).

6. Device according to claims 1 or 2 characterized by the fact that the arc-shaped slot (6) in the pedestal is a circular arc covering 45°.

* * * * *